(12) United States Patent
Gummin et al.

(10) Patent No.: US 11,603,828 B2
(45) Date of Patent: Mar. 14, 2023

(54) OVERSTRESS PROTECTION FOR SHAPE MEMORY ALLOY SEAT ACTUATOR

(71) Applicants: Toyota Motor Engineering & Manufacturing North America, Inc., Plano, TX (US); Miga Technologies, LLC, Silverton, OR (US)

(72) Inventors: Mark A. Gummin, Silverton, OR (US); Umesh N. Gandhi, Farmington Hills, MI (US); Brian J. Pinkelman, Ann Arbor, MI (US); Ryohei Tsuruta, Ann Arbor, MI (US)

(73) Assignees: Toyota Motor Engineering & Manufacturing North America, Inc., Plano, TX (US); Miga Technologies, LLC, Silverton, OR (US)

( * ) Notice: Subject to any disclaimer, the term of this patent is extended or adjusted under 35 U.S.C. 154(b) by 157 days.

(21) Appl. No.: 17/209,774

(22) Filed: Mar. 23, 2021

(65) Prior Publication Data
US 2022/0307485 A1 Sep. 29, 2022

(51) Int. Cl.
*B60N 2/90* (2018.01)
*F03G 7/06* (2006.01)
*B60N 2/02* (2006.01)
*B60N 2/28* (2006.01)
*B60N 2/885* (2018.01)

(52) U.S. Cl.
CPC ............... *F03G 7/065* (2013.01); *B60N 2/99* (2018.02); *B60N 2/0284* (2013.01); *B60N 2/2872* (2013.01); *B60N 2/885* (2018.02); *B60N 2002/0288* (2013.01); *F05C 2251/08* (2013.01)

(58) Field of Classification Search
CPC ........ B60N 2/99; B60N 2/0284; B60N 2/885; B60N 2/2872; B60N 2/0244; B60N 2002/0288; F03G 7/065
See application file for complete search history.

(56) References Cited

U.S. PATENT DOCUMENTS 7,017,345 B2   3/2006   Von Behrens et al.
7,814,810 B2   10/2010  Mitteer
(Continued)

FOREIGN PATENT DOCUMENTS

WO   2019043599 A1   3/2019

*Primary Examiner* — Syed A Islam
(74) *Attorney, Agent, or Firm* — Christopher G. Darrow; Darrow Mustafa PC

(57) ABSTRACT

An actuator for a vehicle seat can be configured to prevent overstress of a shape memory alloy (SMA) wire. The actuator can include a first body member and a second body member pivotably connected to each other. The actuator can include an overstress post and an overstress contact plate operatively connected to the overstress post. Thus, movement of the overstress post causes movement of the overstress contact plate. The actuator can include an overstress contact pin. The actuator can include an SMA wire operatively connected to one of the body members and to the overstress post. When activated, the SMA wire can shrink, causing one of the body members to pivot relative to the other body member and causing the overstress contact plate to move toward the overstress contact pin. If the overstress contact plate contacts the overstress contact pin, the SMA wire can be deactivated.

20 Claims, 7 Drawing Sheets

(56) References Cited

U.S. PATENT DOCUMENTS

| | | | |
|---|---|---|---|
| 7,909,403 B2 | 3/2011 | Lawall et al. | |
| 9,347,609 B2 | 5/2016 | Pinto, IV et al. | |
| 9,714,460 B2 | 7/2017 | Merideth | |
| 10,349,543 B2 * | 7/2019 | Sreetharan | E05D 1/02 |
| 10,441,491 B2 | 10/2019 | Wyatt et al. | |
| 10,843,611 B2 * | 11/2020 | Caruss | B60N 2/0252 |
| 11,091,060 B2 * | 8/2021 | Pinkelman | F03G 7/065 |
| 11,285,844 B2 * | 3/2022 | Gandhi | B60N 2/0244 |
| 11,377,007 B2 * | 7/2022 | Samain | B60N 2/853 |
| 11,458,874 B2 * | 10/2022 | Nagai | B60N 2/10 |
| 2015/0202993 A1 | 7/2015 | Mankame et al. | |
| 2020/0197250 A1 | 6/2020 | Wyatt et al. | |
| 2020/0298732 A1 * | 9/2020 | Gandhi | B60N 2/502 |
| 2020/0307416 A1 * | 10/2020 | Gandhi | B60N 2/68 |

* cited by examiner

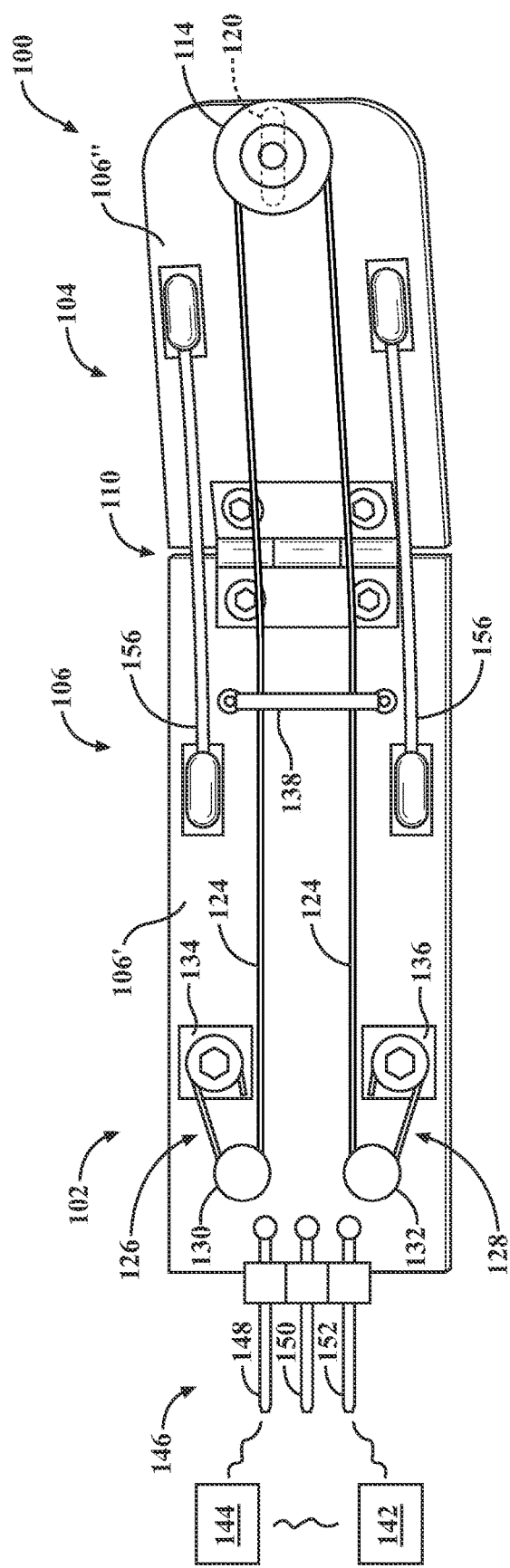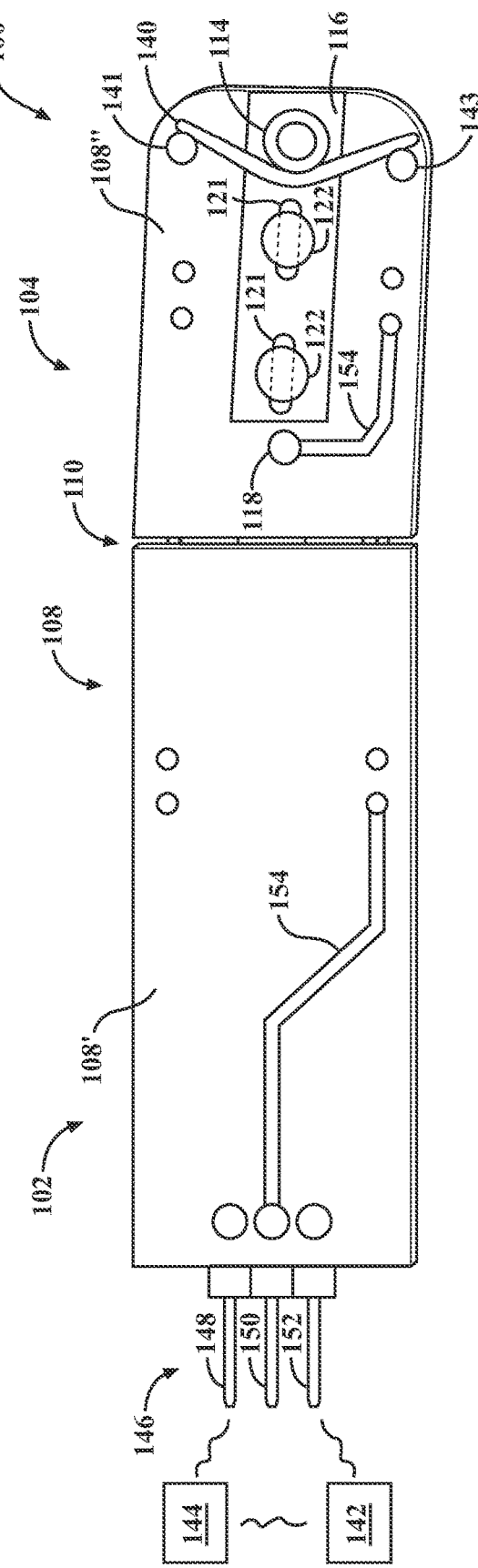
FIG. 1A
FIG. 1B

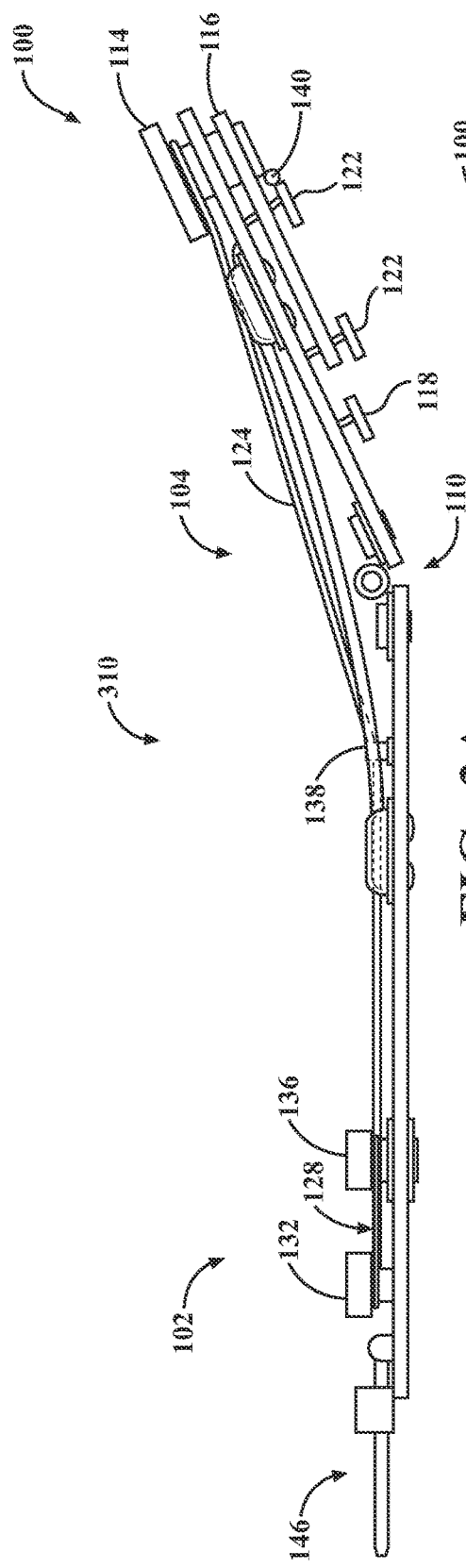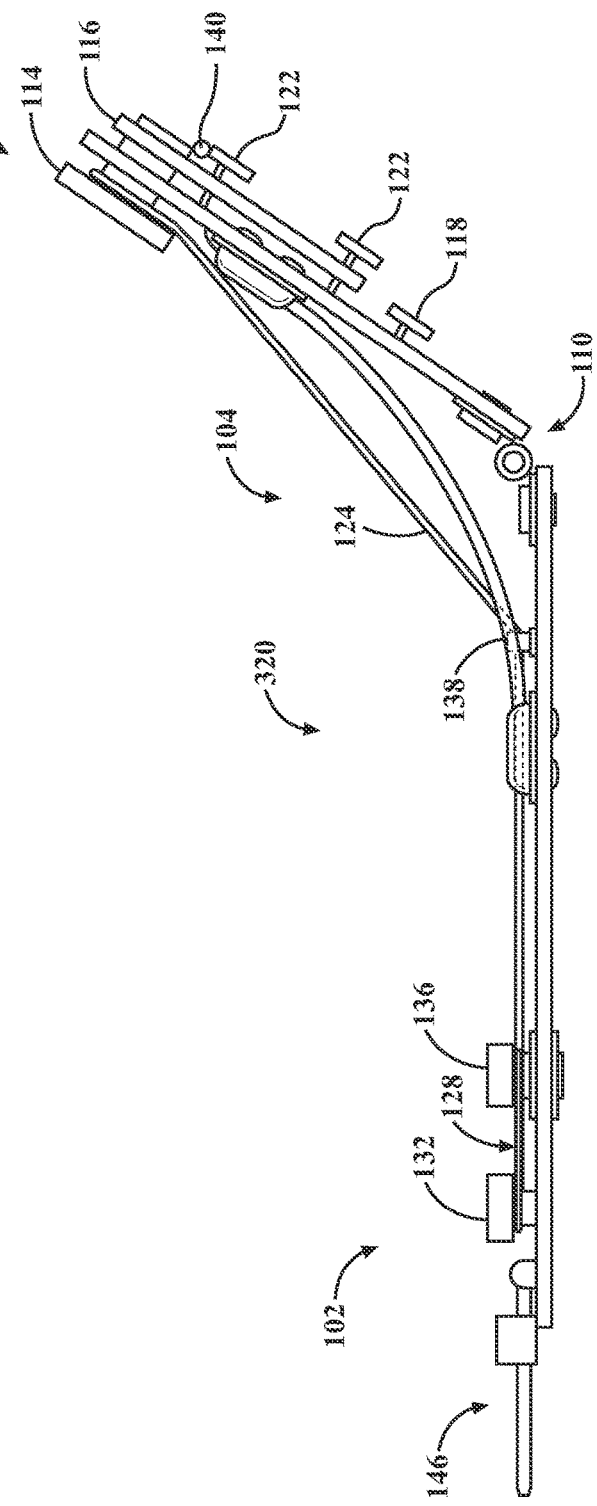
FIG. 3A
FIG. 3B

OVERSTRESS PROTECTION FOR SHAPE MEMORY ALLOY SEAT ACTUATOR

FIELD

The subject matter described herein relates in general to vehicles and, more particularly, to seat actuators in one or more portions of a vehicle seat.

BACKGROUND

Some motor vehicles have actuators in one or more portions of a vehicle seat. For example, a seat actuator can be used in a seat cushion bolster or a seat back bolster. The seat actuator can be activated to cause these bolsters to morph to provide occupant support and/or comfort.

SUMMARY

In one respect, the present disclosure is directed to an actuator for a vehicle seat. The actuator can include a first body member and a second body member. The second body member can be pivotably connected to the first body member. The actuator can include an overstress post. The overstress post can be operatively connected to the second body member. The overstress post can be movable on the second body member. The actuator can include an overstress contact plate. The overstress contact plate can be operatively connected to the overstress post. As a result, movement of the overstress post can cause movement of the overstress contact plate along the second body member. The actuator can include an overstress contact pin. The overstress contact pin can be operatively connected to the second body member. The actuator can include a shape memory alloy wire. The shape memory alloy wire can have a first end portion and a second end portion. The first end portion can be operatively connected to the first body member. The shape memory alloy wire can be operatively connected to the overstress post. The shape memory alloy wire can be configured such that, when activated, the shape memory alloy wire shrinks, causing one of the first body member and the second body member to pivot relative to the other one of the first body member and the second body member, which can cause the overstress contact plate to move toward the overstress contact pin.

In another respect, the present disclosure is directed to an overstress protection system. The overstress protection system can include an actuator. The actuator can include a first body member and a second body member. The second body member can be pivotably connected to the first body member. The actuator can include an overstress post. The overstress post can be operatively connected to the second body member. The overstress post can be movable on the second body member. The actuator can include an overstress contact plate. The overstress contact plate can be operatively connected to the overstress post. As a result, movement of the overstress post can cause movement of the overstress contact plate along the second body member. The actuator can include an overstress contact pin. The overstress contact pin can be operatively connected to the second body member. The actuator can include a shape memory alloy wire. The shape memory alloy wire can have a first end portion and a second end portion. The first end portion can be operatively connected to the first body member. The shape memory alloy wire can be operatively connected to the overstress post. The shape memory alloy wire can be configured such that, when activated, the shape memory alloy wire shrinks, causing one of the first body member and the second body member to pivot relative to the other one of the first body member and the second body member, which can cause the overstress contact plate to move toward the overstress contact pin. The overstress protection system can include one or more processors. The one or more processors can be configured to activate or deactivate the shape memory alloy wire.

In another respect, the present disclosure is directed to an overstress protection system. The overstress protection system can include an actuator. The actuator can include a first body member and a second body member. The second body member can be pivotably connected to the first body member. The actuator can include an overstress post. The overstress post can be operatively connected to the second body member. The overstress post can be movable on the second body member. The actuator can include an overstress contact plate. The overstress contact plate can be operatively connected to the overstress post. As a result, movement of the overstress post can cause movement of the overstress contact plate along the second body member. The actuator can include an overstress contact pin. The overstress contact pin can be operatively connected to the second body member. The actuator can include a shape memory alloy wire. The shape memory alloy wire can have a first end portion and a second end portion. The first end portion can be operatively connected to the first body member. The shape memory alloy wire can be operatively connected to the overstress post. The shape memory alloy wire can be configured such that, when activated, the shape memory alloy wire shrinks, causing one of the first body member and the second body member to pivot relative to the other one of the first body member and the second body member, which can cause the overstress contact plate to move toward the overstress contact pin. The actuator can include a spring. The spring can be operatively positioned to resist movement of the overstress post in a direction toward one of the first body member and the second body member. The spring can have a pre-determined bias. When a force exerted by the shape memory alloy wire on the overstress post exceeds the pre-determined bias of the spring, the overstress contact plate contacts the overstress contact pin. The overstress protection system can include one or more processors. The one or more processors can be configured to activate the shape memory alloy wire in response to an activation input. The one or more processors can be configured to deactivate the shape memory alloy wire in response to a deactivation condition. The deactivation condition can include when the overstress contact plate contacts the overstress contact pin.

BRIEF DESCRIPTION OF THE DRAWINGS

FIG. 1A is an example of a seat actuator, showing a first side of the seat actuator.

FIG. 1B is an example of the seat actuator of FIG. 1A, showing a second side of the seat actuator.

FIG. 3A is an example of the seat actuator of FIGS. 1A and 1B, showing an example of a deactivated configuration.

FIG. 3B is an example of the seat actuator of FIGS. 1A and 1B, showing an example of an activated configuration.

DETAILED DESCRIPTION

Figure 2A:
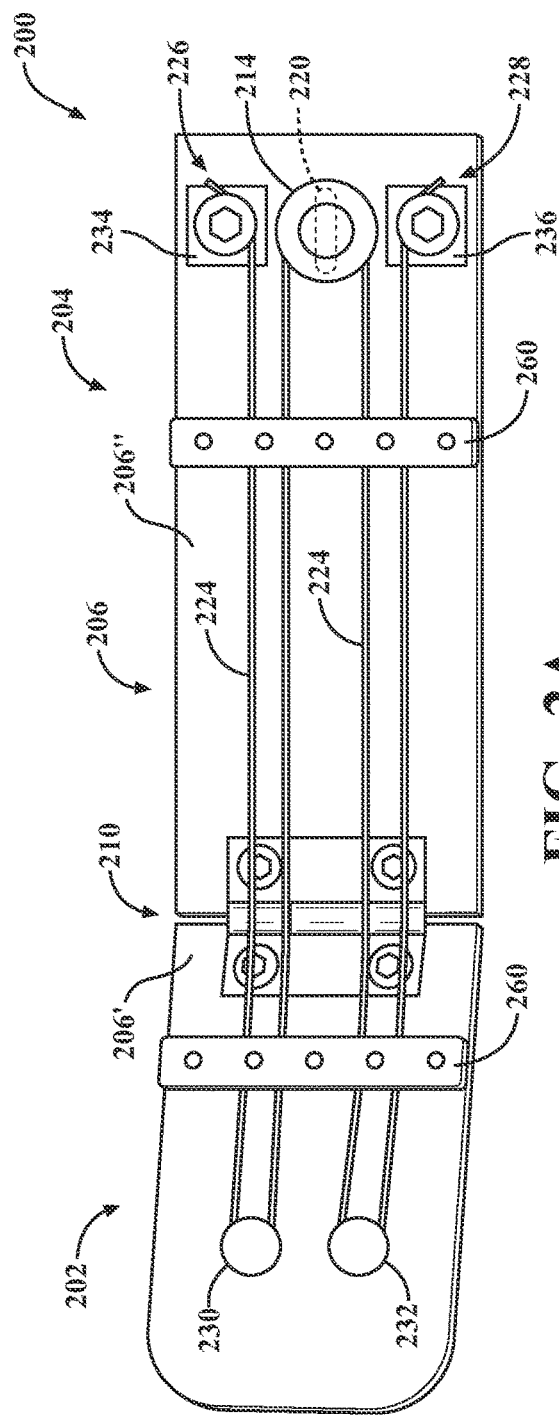
FIG. 2A is an example of a seat actuator, showing a first side of the seat actuator.

A seat actuator can include shape memory material, for example, shape memory alloy (SMA), for activation. The seat actuator can be configured such that, in response to an activation input (for example, electrical energy), the shape memory material shrinks, causing the seat actuator to morph into an activated configuration.

In some examples, activation of the shape memory material may cause the material to become overstressed, which can damage the shape memory material and affect operation of the seat actuator. According to arrangements described herein, the seat actuator can be configured to prevent overstress in the shape memory material. The seat actuator can be configured such that, when an overstress condition is detected, an activation input to the shape memory material can be disabled, thereby reducing stress in the shape memory material.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIGS. 1A and 1B, one example of a seat actuator 100 is shown. The seat actuator 100 can have a first body member 102 and a second body member 104. The first body member 102 and the second body member 104 can have any suitable shape. In the example shown in FIGS. 1A and 1B, the first body member 102 and the second body member 104 can have a substantially rectangular shape. However, it will be understood that the first body member 102 and the second body member 104 are not limited to being substantially rectangular. In other examples, the first body member 102 and/or the second body member 104 can have a substantially oval, substantially circular, or substantially polygonal shape.

The first body member 102 and the second body member 104 can be made of any suitable material. For example, the first body member 102 and/or the second body member 104 can be printed circuit boards (PCBs). In other examples, the first body member 102 and/or the second body member 104 can be made of metal or plastic.

The first body member 102 and the second body member 104 can be substantially identical to each other in one or more respects, for example, in size, shape, and/or material. Alternatively, the first body member 102 and the second body member 104 can be different from each other in one or more respects, for example, in size, shape, and/or material.

The first body member 102 can have a first side 106' and a second side 108'. The second body member 104 can have a first side 106" and a second side 108". As such, the seat actuator 100 can have a first side 106, which includes the first side 106' of the first body member 102 and the first side 106" of the second body member 104. The seat actuator 100 can have a second side 108, which includes the second side 108' of the first body member 102 and the second side 108" of the second body member 104. The first side 106 of the seat actuator 100 can be substantially opposite the second side 108 of the seat actuator 100.

The first body member 102 and the second body member 104 can be pivotably connected to each other. Any suitable type of pivotable connection can be used. For example, in one or more arrangements, the first body member 102 and the second body member 104 can be pivotably connected to each other by a hinge 110. The hinge 110 can allow pivoting movement of the first body member 102 and/or the second body member 104 about a common axis.

The hinge 110 can be any type of hinge, now known or later developed. The hinge 110 can be operatively connected to the first body member 102 and/or the second body member 104 in any suitable manner. For example, the hinge 110 can be operatively connected to the first body member 102 and/or the second body member 104 by one or more fasteners, one or more adhesives, one or more welds, one or more forms of mechanical engagement, and/or one or more other forms of connection.

In some examples, such as is shown in FIGS. 1A and 1B, the first body member 102 and the second body member 104 can be separate from each other. In another example, the first body member 102 and the second body member 104 can be formed from a unitary piece of material. In this example, the first body member 102 and the second body member 104 can be joined at a region in which the material is thinner compared to the first body member 102 and the second body member 104. The thinner material region can allow for pivoting movement of the first body member 102 and/or the second body member 104. As such, the thinner material region can form the hinge 110 or can be used in connection with the hinge 110.

The hinge 110 can be configured to allow any suitable range of motion. For example, according to one or more arrangements, the hinge 110 can allow the first body member 102 and/or the second body member 104 to have a pivoting range of at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 65 degrees, at least about 70 degrees, at least about 75 degrees, at least about 80 degrees, at least about 85 degrees, and/or at least about 90 degrees, just to name a few possibilities.

In one or more examples, the seat actuator 100 can be configured such that the first body member 102 can remain substantially stationary and the second body member 104 can pivot relative to the first body member 102. In other examples, the seat actuator 100 can be configured such that the second body member 104 can remain substantially stationary and the first body member 102 can pivot relative to the second body member 104. In yet other examples, the seat actuator 100 can be configured such that both the first body member 102 and the second body member 104 can both pivot relative to each other.

The seat actuator 100 can include an overstress post 114, an overstress contact plate 116, and an overstress contact pin 118. The overstress post 114 can be operatively connected to the second body member 104. The overstress post 114 can be located substantially on the first side 106" of the second body member 104. In some examples, a portion of the overstress post 114 can also be located on the second side 108" of the second body member 104. The overstress contact plate 116 and the overstress contact pin 118 can be operatively connected to the second body member 104. The overstress contact plate 116 and the overstress contact pin 118 can be located substantially on the second side 108" of the second body member 104.

A slot 120 can be defined in the second body member 104. The slot 120 can permit movement of the overstress post 114 therein. Additionally, one or more slots 121 can be defined in the overstress contact plate 116. The slot(s) 121 in the overstress contact plate 116 can permit movement of the overstress contact plate 116 on the second side 108" of the second body member 104. The slot(s) 121 can be substantially aligned with each other.

The slots 120, 121 can be any suitable size and/or shape. For example, the slots 120, 121 can be substantially oval in shape. In another example, the slots 120, 121 can be substantially rectangular. In either or more examples, the slots 120, 121 can be elongated generally in a direction extending between the overstress post 114 and the overstress contact pin 118. The slots 120, 121 can be substantially identical to each other, or one or more of the slots 120, 121 can be different from the other slots in one or more respects.

The overstress post 114 can be operatively connected to the second body member 104 such that the overstress post 114 extends through the slot 120. Thus, the overstress post 114 can be movable on the second body member 104 by being moveable along the slot 120. The overstress post 114 can extend through the slot 120 and into operative connection with the overstress contact plate 116.

The overstress contact plate 116 can be operatively connected to the second body member 104 by one or more retention posts 122. The retention post(s) 122 can extend through the slot(s) 121 and into operative connection with the second side 108" of the second body member 104. The retention post(s) 122 can retain the overstress contact plate 116 substantially adjacent to the second body member 104. For example, the retention post(s) 122 can retain the overstress contact plate 116 substantially adjacent to the second body member 104 such that the overstress contact plate 116 is substantially parallel to the second body member 104.

The overstress contact plate 116 can be operatively connected to the overstress post 114. Thus, movement of the overstress post 114 can cause movement of the overstress contact plate 116. The slots 120, 121 can restrict movement of the overstress post 114 and the overstress contact plate 116 to substantially linear movement in a direction toward or away from the overstress contact pin 118. For example, when the overstress post 114 moves along the slots 120 toward the overstress contact pin 118, the overstress contact plate 116 can move toward the overstress contact pin 118.

The overstress contact pin 118 can be operatively connected to the second side 108" of the second body member 104. The overstress contact pin 118 can be operatively connected to the second body member 104 between the overstress contact plate 116 and the hinge 110. The overstress contact pin 118 can be located substantially near the overstress contact plate 116. As used herein, the term "substantially near" means that the overstress contact pin 118 is located within the range of motion of the overstress contact plate 116. Thus, when the overstress contact plate 116 moves toward the overstress contact pin 118, the overstress contact plate 116 has a range of motion that may, in certain circumstances as explained herein, result in the overstress contact plate 116 coming into contact with the overstress contact pin 118. As such, the distance between the overstress contact pin 118 and a portion of the overstress contact plate 116 nearest to the overstress contact pin 118 can be relatively small. For example, the distance can be substantially from about 0.01 inches (in) to about 0.1 in. In other examples, the distance can be any suitable length.

The overstress post 114 can be made of any suitable material. In one example, at least a portion of the overstress post 114 can be made of nylon. In another example, at least a portion of the overstress post 114 can be made of any metal or plastic material. In some arrangements, at least a portion of each of the overstress contact plate 116 and the overstress contact pin 118 can be made of any conductive material.

The seat actuator 100 can include a shape memory alloy wire 124. "Shape memory alloy," as described herein, is a material that changes shape when an activation input (for example, electrical energy) is supplied to the shape memory material and, when the activation input is disabled, the material substantially returns to its original shape. Thus, when an activation input is supplied to the shape memory alloy wire 124, the shape memory alloy wire 124 can shrink. The shape memory alloy wire 124 can be heated in any suitable manner, now known or later developed. For example, the shape memory alloy wire 124 can be heated by the Joule effect by passing electrical energy through the shape memory alloy wire 124. In some examples, arrangements can provide for cooling of the shape memory alloy wire 124.

The shape memory alloy wire 124 can be operatively connected to the seat actuator 100 at any suitable location. The shape memory alloy wire 124 can include a first end portion 126 and a second end portion 128. The term "end portion," as used herein, includes the end as well as an area near the end. As shown in FIG. 1A, the seat actuator 100 can include a first connection post 130 and a second connection post 132. The first connection post 130 and the second connection post 132 can be located substantially on the first side 106 of the seat actuator 100, for example, on the first side 106' of the first body member 102. Also shown in FIG. 1A, the seat actuator 100 can include a first connection area 134 and a second connection area 136. The first connection area 134 and the second connection area 136 can be located substantially on the first side 106 of the seat actuator 100, for example, on the first side 106' of the first body member 102. In other examples, the first connection post 130, the second connection post 132, the first connection area 134, and/or the second connection area 136 can be located at any suitable location on the seat actuator 100.

The shape memory alloy wire 124 can be routed in any suitable manner on the seat actuator 100. For example, the first end portion 126 of the shape memory alloy wire 124 can wrap around the first connection post 130 and can be operatively connected to the first connection area 134. The first end portion 126 can wrap around the first connection area 134 and/or can be operatively connected to the first connection area 134 in any suitable manner (for example, one or more fasteners, one or more welds, one or more forms of mechanical engagement, etc.). The second end portion 128 of the shape memory alloy wire 124 can wrap around the second connection post 132 and can be operatively connected to the second connection area 136. The second end portion 128 can wrap around the second connection area 136 and/or can be operatively connected to the second connection area 136 in any suitable manner (for example, one or more fasteners, one or more welds, one or more forms of mechanical engagement, etc.). In other examples, the first end portion 126 and/or the second end portion 128 of the shape memory alloy wire 124 can be operatively connected to the first side 106 of the seat actuator 100. For example, the first end portion 126 and/or the second end portion 128 can be operatively connected to the first side 106' of the seat actuator 100 in any suitable manner (for example, one or more fasteners, one or more welds, one or more forms of mechanical engagement, etc.). In another example, the first end portion 126 and/or the second end portion 128 can be operatively connected to the second side 108' of the seat actuator 100 in any suitable manner (for example, one or more fasteners, one or more welds, one or more forms of mechanical engagement, etc.).

The shape memory alloy wire 124 can be operatively connected to the overstress post 114. In one example, as shown in FIG. 1A, the shape memory alloy wire 124 can be a single shape memory alloy wire 124. The first end portion 126 and the second end portion 128 can be operatively connected to the first body member 102, for example, operatively connected to the first connection post 130, the second connection post 132, the first connection area 134, the second connection area 136, and/or the first side 106' of the first body member 102. The single shape memory alloy wire 124 can extend from the first body member 102 to the overstress post 114, where it can wrap around the overstress post 114 and extend back to the first body member 102. The single shape memory alloy wire 124 can wrap one or more times around the overstress post 114.

In another example, the first end portion 126 of the single shape memory alloy wire 124 can be operatively connected to the first body member 102 and the second end portion 128 of the single shape memory alloy wire 124 can be operatively connected to the overstress post 114. In yet another example, the shape memory alloy wire 124 can be two separate pieces of shape memory alloy wire. In this example, a first piece of shape memory alloy wire can be operatively connected to the first body member 102 and the overstress post 114, and a second piece of shape memory alloy wire can be operatively connected to the first body member 102 and the overstress post 114.

In any of the above examples and/or in other examples, the shape memory alloy wire 124 can be configured such that when the shape memory alloy wire 124 shrinks, the first body member 102 or the second body member 104 can pivot relative to the other body member, and the overstress post 114 and the overstress contact plate 116 can move toward the overstress contact pin 118. In the example shown in FIGS. 1A-1B, the second body member 104 can pivot relative to the first body member 102 when the shape memory alloy wire 124 contracts. This process is described in further detail below.

The shape memory alloy wire 124 can have any suitable characteristics. For example, the shape memory alloy wire 124 can be a high temperature wire with an austenite finish temperature from about 90 degrees Celsius to about 110 degrees Celsius. The shape memory alloy wire 124 can have any suitable diameter. For example, the shape memory alloy wire 124 can be from about 0.2 millimeters (mm) to about 0.7 mm, from about 0.3 mm to about 0.5 mm, or from about 0.375 mm to about 0.5 mm in diameter. In some arrangements, the shape memory alloy wire 124 can have a stiffness of up to about 70 gigapascals. The shape memory alloy wire 124 can be configured to provide an initial moment of from about 300 to about 600 Newton·millimeters (N·mm), or greater than about 500 N·mm, where the unit of one Newton·millimeter is a unit of torque (i.e., moment) in the SI system. One Newton·millimeter is equal to the torque resulting from a force of one Newton applied perpendicularly to the end of a moment arm that is one meter long.

The shape memory alloy wire 124 can be made of any suitable shape memory material, now known or later developed. Different materials can be used to achieve various balances, characteristics, properties, and/or qualities. For example, a shape memory alloy wire 124 can include nickel-titanium (NiTi). One example of a nickel-titanium shape memory alloy is FLEXINOL, which is available from Dynalloy, Inc., Irvine, Calif. In another example, the shape memory alloy wire 124 can be made of copper-aluminum-nickel alloy, (CuAlNi), iron-magnesium-silicon alloy (FeMnSi), or copper-zinc-aluminum alloy (CuZnAl).

The shape memory alloy wire 124 can be configured to increase or decrease in length upon changing phase, for example, by being heated to a phase transition temperature $T_{SMA}$. Utilization of the intrinsic properties of shape memory alloy wire 124 can be accomplished by using heat, for example, by passing electric energy through the wire in order to provide heat generated by electrical resistance, in order to change a phase or crystal structure transformation (i.e., twinned martensite, detwinned martensite, and austenite) resulting in a lengthening or shortening of the wire. In some implementations, during the phase change, the shape memory alloy wire 124 can experience a decrease in length of from about 2 to about 8 percent, or from about 3 percent to about 6 percent, and in some examples, about 3.5 percent, when heated from a temperature less than the $T_{SMA}$ to a temperature greater than the $T_{SMA}$.

Other active materials may be used in connection with the arrangements described herein. For example, other shape memory materials may be employed, including shape memory polymers. Shape memory materials, a class of active materials, (i.e., smart materials), include materials or compositions that have the ability to remember their original shape, which can subsequently be recalled by applying an external stimulus, such as an activation signal.

While the shape memory alloy wire 124 is described herein as being a wire, it will be understood that the shape memory alloy wire 124 is not limited to being a wire. In other examples, the shape memory material can take the form of strips, small sheets or slabs, cellular or lattice structures, helical or tubular springs, braided cables, tubes, wires arranged in a serpentine manner, a plurality of individual straight wires, and/or combinations thereof, just to name a few examples. Additionally or alternatively, the shape memory alloy wire 124 may include an insulated coating.

When the shape memory alloy wire 124 is activated, it can shrink. As such, when the seat actuator 100 is activated, the shape memory alloy wire 124 can move away from the first side 106 of the seat actuator 100. In order to constrain movement of the shape memory alloy wire 124 away from the seat actuator 100, the seat actuator 100 can include one or more guideposts 138, as shown in FIG. 1A. The guidepost(s) 138 can be operatively connected to the seat actuator 100 at any suitable location. For example, the guidepost(s) 138 can be operatively connected to the first side 106' of the first body member 102. In another example, the guidepost(s) 138 can operatively connected to the first side 106" of the second body member 104. The shape memory alloy wire 124 can pass between the guidepost(s) 138 and the first side 106 of the seat actuator 100 as it extends between the first body member 102 and the second body member 104. As such, the guidepost(s) 138 can restrict movement of the shape memory alloy wire 124 away from the seat actuator 100. The guidepost(s) 138 can also prevent bending of the shape memory alloy wire 124 at any other area along its length.

The guidepost(s) 138 can have any suitable size, shape, and/or configuration. In one or more arrangements, the guidepost(s) 138 can be generally U-shaped. For example, the guidepost(s) 138 can include two supports and a crossbeam. The two supports can be operatively connected to the first side 106 of the seat actuator 100. The two supports can extend substantially perpendicular to the first side 106 of the seat actuator 100. The crossbeam can be operatively connected to the two supports. In some examples, the two supports and the crossbeam can be a unitary structure. The cross beam can extend substantially parallel to the first side 106 of the seat actuator 100.

When the seat actuator 100 is activated, the shape memory alloy wire 124 may become overstressed if the tension in the shape memory alloy wire 124 exceeds a certain threshold. The components of the seat actuator 100 as described above can work in connection with a spring 140, as shown in FIG. 1B, to prevent overstress of the shape memory alloy wire 124. The spring 140 can be any type of spring, now known or later developed. The spring 140 can be operatively connected to the second side 108" of the second body member 104. For example, a first end post 141 and a second end post 143 can be operatively connected to the second body member 104. As such, the spring 140 can be operatively positioned with respect to the overstress post 114, the first end post 141, and the second end post 143. The overstress contact plate 116 can be positioned between the spring 140 and the second body member 104.

The spring 140 can have a pre-determined bias. The pre-determined bias can correspond to a threshold stress level of the shape memory alloy wire 124. For example, the threshold stress level can be from about 1 pound (lb) to about 1.5 pounds (lbs). In another example, the threshold stress level can be from about 0.5 lbs to about 20 lbs. As such, the spring 140 can resist movement of the overstress post 114, and correspondingly, the overstress contact plate 116, toward the overstress contact pin 118. However, once the threshold stress level is exceeded, the bias of the spring 140 can be overcome, thereby allowing the overstress post 114 and the overstress contact plate 116 to move in a direction toward the overstress contact pin 118.

The seat actuator 100 can include one or more elements configured to provide or disable one or more inputs to the shape memory alloy wire 124. For example, the seat actuator 100 can include one or more processors 142, one or more switches 144, and one or more connectors 146. Each of the processor(s) 142, the switch(es) 144, and the connector(s) 146, or any combination thereof, can be integrated into the seat actuator 100, for example, provided on the first body member 102 or the second body member 104. Alternatively, each of the processor(s) 142, the switch(es) 144, and the connector(s) 146, or any combination thereof, can be located remotely from the seat actuator 100, as shown in FIGS. 1A and 1B.

The processor(s) 142, the switch(es) 144, and the connector(s) 146 can be operatively connected to each other, for example, in electrical communication with each other. The processor(s) 142, the switch(es) 144, and the connector(s) 146 can be operatively connected to each other to form a switching circuit, or any other suitable type of circuit. Each of the processor(s) 142, the switch(es) 144, and the connector(s) 146 will be described in turn below.

The processor(s) 142 can be configured to provide one or more signals to the switch(es) 144. For example, the processor(s) 142 can be configured to provide an activation signal to the switch(es) 144. An activation signal can include an instruction to the switch(es) 144 to enable an activation input, for example, to enable a supply of electrical energy, to the shape memory alloy wire 124. In another example, the processor(s) 142 can be configured to provide a deactivation signal to the switch(es) 144. A deactivation signal can include an instruction to the switch(es) 144 to disable an activation input, for example, to disable a supply of electrical energy, to the shape memory alloy wire 124. In other examples, a deactivation signal can include an instruction to the switch(es) 144 to not provide an activation input, for example, to not supply electrical energy, to the shape memory alloy wire 124.

The switch(es) 144 can be any suitable switch, now known or later developed. In one or more arrangements, the switch(es) 144 can be metal-oxide-semiconductor field-effect transistor (MOSFET) switch(es), just to name one example.

The connector(s) 146 can be operatively connected to the first body member 102, as shown in FIGS. 1A and 1B. However, the connector(s) 146 can be operatively connected to any suitable portion of the seat actuator 100. The connector(s) 146 can be configured to convey a supply of electrical energy from the switch(es) 144 to the shape memory alloy wire 124. The connector(s) 146 can also be configured to provide one or more signals to and/or receive one or more signals from the processor(s) 142.

The connector(s) 146 can be any suitable connector. In one example, as shown in FIGS. 1A and 1B, the connector(s) 146 can be a 3-pin connector. In another example, the connector(s) 146 can be any suitable connector having a plurality of pins, such as a 9-pin connector or a 12-pin connector, just to name a few examples. In the example of a 3-pin connector, the connector(s) 146 can include a power pin 148, a signal pin 150, and a ground pin 152. The power pin 148 can be configured to provide power to the seat actuator 100, for example, by supplying electrical energy to the seat actuator 100. More particularly, the power pin 148 can be configured to provide power to the first end portion 126 of the shape memory alloy wire 124. As such, the power pin 148 can be configured to pass electrical energy through the shape memory alloy wire 124 in order to heat the shape memory alloy wire 124 through the Joule effect. Suitable traces or other conductive elements can be used to electrically connect the power pin 148 to the shape memory alloy wire 124.

The signal pin 150 can be operatively connected to the overstress contact pin 118. As shown, the signal pin 150 is in electrical communication with the overstress contact pin 118 via one or more traces 154 (FIG. 1B) and/or one or more wires 156 (FIG. 1A). The signal pin 150 can be configured to communicate a signal to the processor(s) 142 when the overstress contact plate 116 contacts the overstress contact pin 118. The ground pin 152 can be configured to provide a zero voltage reference and a common return for electric energy in the seat actuator 100.

While specific locations of the components of the seat actuator 100 have been described above in connection with FIGS. 1A and 1B, it should be appreciated that the components of the seat actuator 100 can be operatively connected to the seat actuator 100 at any suitable location. For example, FIGS. 2A-2C show an example of another suitable configuration of the seat actuator 100.

Figure 2B:
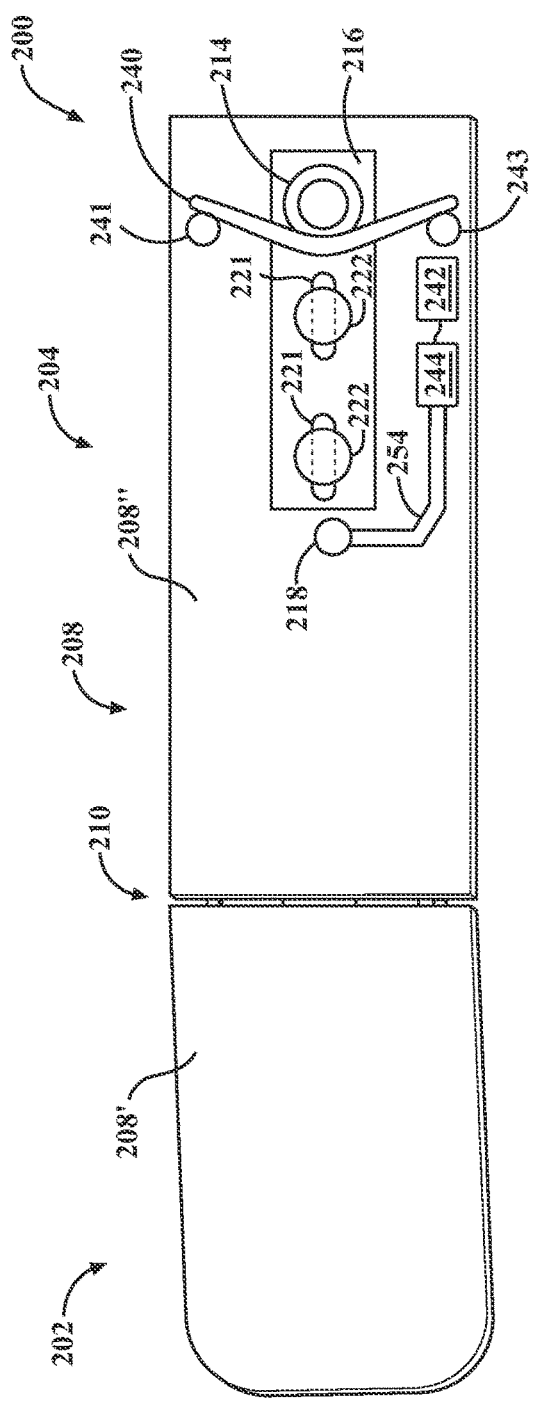
FIG. 2B is an example of the seat actuator of FIG. 2A, showing a second side of the seat actuator.
Figure 2C:
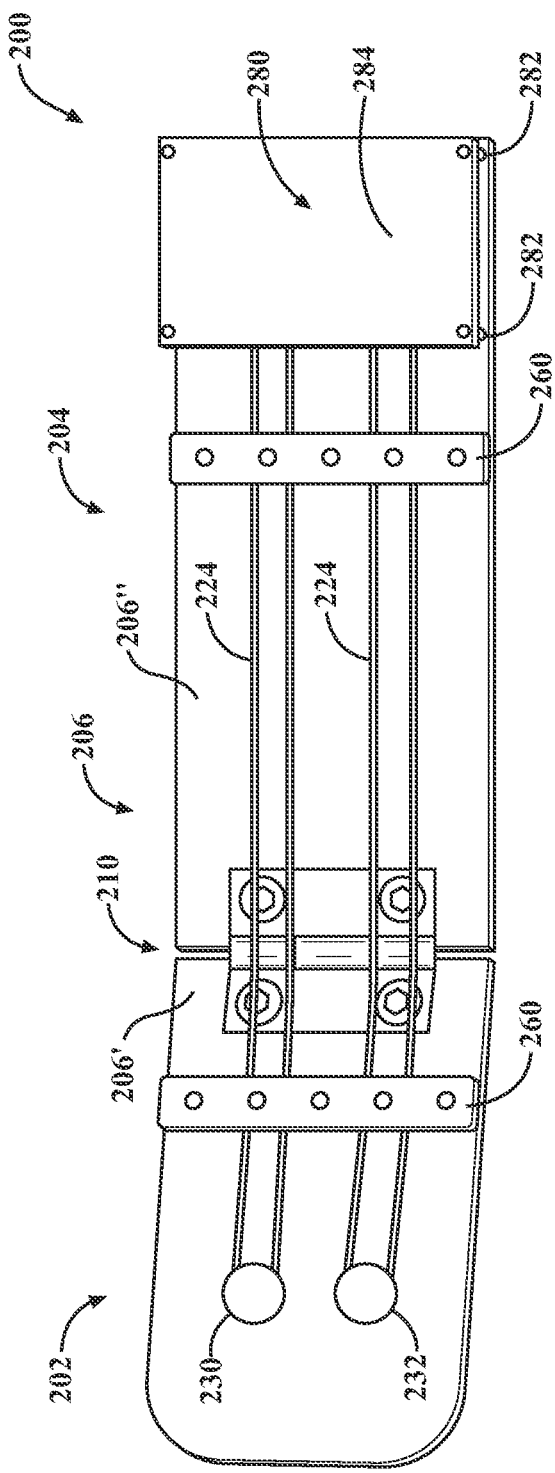
FIG. 2C is an example of the seat actuator of FIGS. 2A and 2B, showing a housing provided on the first side of the seat actuator.

As shown in FIGS. 2A-2C, a seat actuator 200 can include some or all of the previously mentioned components. For example, the seat actuator 200 can include a first body member 202 and a second body member 204. The first body member 202 can have a first side 206' and a second side 208'. The second body member 204 can have a first side 206" and a second side 208". As such, the seat actuator 200 can have a first side 206, which includes the first side 206' of the first body member 202 and the first side 206" of the second body member 204. The seat actuator 200 can have a second side 208, which includes the second side 208' of the first body member 202 and the second side 208" of the second body member 204. The first side 206 of the seat actuator 200 can be substantially opposite the second side 208 of the seat actuator 200.

The seat actuator 200 can also include a hinge 210. In one or more arrangements, the hinge 210 can be the hinge 110 described in connection with FIGS. 1A and 1B. The seat actuator 200 can also include an overstress post 214, an overstress contact plate 216, and an overstress contact pin 218. In one or more arrangements, the overstress post 214, the overstress contact plate 216, and the overstress contact pin 218 can be the overstress post 114, the overstress contact plate 116, and the overstress contact pin 118 described in connection with FIGS. 1A and 1B, respectively. The seat actuator 200 can also include slots 220, 221. In one or more arrangements, the slots 220, 221 can be the slots 120, 121 described in connection with FIGS. 1A and 1B. The seat actuator 200 can also include retention post(s) 222. In one or more arrangements, the retention post(s) 222 can be the retention post(s) 122 described in connection with FIGS. 1A and 1B. The seat actuator 200 can also include a shape memory alloy wire 224 having a first end portion 226 and a second end portion 228. In one or more arrangements, the shape memory alloy wire 224 can be the shape memory alloy wire 124 described in connection with FIGS. 1A and 1B. The seat actuator can also include a first connection post 230, a second connection post 232, a first connection area 234, and a second connection area 236. The first connection post 230, the second connection post 232, the first connection area 234, and the second connection area 236 can be the first connection post 130, the second connection post 132, the first connection area 134, and the second connection area 136 described in connection with FIGS. 1A and 1B, respectively. The seat actuator can also include a spring 240. In one or more arrangements, the spring 240 can be the spring 140 described in connection with FIGS. 1A and 1B. The seat actuator can also include one or more processors 242, one or more switches 244, and a trace 254. The processor(s) 242, the switch(es) 244, and the trace 254 can be the processor(s) 142, the switch(es) 144, and the trace 154 described in connection with FIGS. 1A and 1B, respectively.

As shown in FIG. 2A, the overstress post 214 can be operatively connected to the second body member 204. A portion of the overstress post 214 can be located substantially on the first side 206" of the second body member 204, and a portion of the overstress post 214 can be located on the second side 208" of the second body member 204. The first connection post 230 and the second connection post 232 can be operatively connected to the first body member 202. The first connection area 234 and second connection area 236 can be operatively connected to the first side 206" of the second body member 204. As such, the first end portion 226 of the shape memory alloy wire 224 can be operatively connected to the first connection area 234, and the second end portion 228 of the shape memory alloy wire 224 can be operatively connected to the second connection area 236.

The shape memory alloy wire 224 can routed in any suitable way on the seat actuator 200. For example, the shape memory alloy wire 224 can extend from the first connection area 234 to the first connection post 230, from the first connection post 230 to the overstress post 214, from the overstress post 214 to the second connection post 232, and from the second connection post 232 to the second connection area 236. Thus, the shape memory alloy wire 224 can form an M-like configuration across the first body member 202 and the second body member 204, where the shape memory alloy wire 224 can be operatively connected to the first connection post 230, the second connection post 232, the first connection area 234, the second connection area 236, and/or the overstress post 214.

The seat actuator 200 can include one or more guideposts. These guidepost(s) can take the form of the guidepost(s) 138 as described in connection with FIG. 1A. Alternatively, as shown in FIGS. 2A and 2C, the seat actuator 200 can include one or more guideplates 260. The guideplate(s) 260 can be operatively connected to the first side 206' of the first body member 202 and/or the first side 206" of the second body member 204. As the shape memory alloy wire 224 extends from the first body member 202 to the second body member 104, the shape memory alloy wire 224 can pass between the guideplate(s) 260 and the first side 206 of the seat actuator 200. The guideplate(s) 260 can include recesses to allow for the passage of the shape memory alloy wire 224.

As shown in FIG. 2B, the overstress contact plate 216 and the overstress contact pin 218 can be operatively connected to the second side 208" of the second body member 204. The second body member 204 can define the slot 220 and the overstress contact plate 216 can define the slot(s) 221. The overstress contact plate 216 can be operatively connected to the second body member 204 by the retention post(s) 222. The retention post(s) 222 can extend through the slot(s) 221 and into operative connection with the second body member 204.

As shown in FIG. 2B, the processor(s) 242 and the switch(es) 244 can be operatively connected to the second side 208" of the second body member 204. The switch(es) 244 can be operatively connected to the overstress contact pin 218 by the trace 254. Alternatively, the seat actuator 200 can include the processor(s) 142, the switch(es) 144, the connector(s) 146, the trace 154, and/or the wire(s) 156 as described in connection with FIGS. 1A and 1B.

In some arrangements, the seat actuator 200 can be configured to protect one or more portions of the seat actuator 200, for example, the overstress post 214. For example, as shown in FIG. 2C, the seat actuator 200 can include a housing 280. The housing 280 can be operatively connected to the first side 206" of the second body member 204. The housing 280 can include a plurality of housing supports 282 and a housing plate 284. The housing supports 282 can be operatively connected to the first side 206" of the second body member 204 substantially perpendicular to the first side 206" of the second body member 204. The housing plate 284 can be operatively connected to the housing supports 282 substantially parallel to the first side 206" of the second body member 204. The housing 280 can be operatively connected to the second body member 204 such that the housing 280 covers at least a portion of the overstress post 214. While the housing 280 is shown in connection with the seat actuator 200 of FIGS. 2A-2C, it will be appreciated that the housing 280 can also be provided on the seat actuator 100 of FIGS. 1A and 1B.

While the components of the seat actuator 100, 200 have been described above in two different examples in connection with FIGS. 1A and 1B and 2A-2C, it will be appreciated that the components of the seat actuator 100, 200 can be operatively connected to the seat actuator 100, 200 in any other suitable locations. For example, the components of the seat actuator 100, 200 can be distributed in different arrangements on the first body members 102, 202 and the second body members 104, 204. Thus, the seat actuator 100, 200 can take other forms not described herein.

In either or more configurations, the seat actuator 100, 200 can be configured to be activated and deactivated. FIG. 3A shows a deactivated configuration 310 of the seat actuator 100 of FIGS. 1A and 1B, and FIG. 3B shows an activated configuration 320 of the seat actuator 100 of FIGS. 1A and 1B. While FIGS. 3A and 3B show the seat actuator 100 of FIGS. 1A and 1B, it will be appreciated that the seat actuator 200 of FIGS. 2A-2C can also be configured to be activated and deactivated in the same or a similar manner. Thus, the deactivated configuration 310 and the activated configuration 320 can also apply to the seat actuator 200 of FIGS. 2A-2C.

The seat actuator 100 can be configured to switch between the deactivated configuration 310 (FIG. 3A) and the activated configuration 320 (FIG. 3B). The processor(s) 142, the switch(es) 144, and the connector(s) 146 can be configured to switch the seat actuator 100 between the deactivated configuration 310 and the activated configuration 320. FIG. 3A shows an example of the deactivated configuration 310 of the seat actuator 100. In the deactivated configuration 310, an activation input is not provided to the shape memory alloy wire 124. For example, the processor(s) 142 does not provide an activation signal to the switch(es) 144, and the switch(es) 144 does not enable a supply of electrical energy to the power pin 148. As such, the shape memory alloy wire 124 is not heated and does not shrink, and second body member 104 does not pivot relative to the first body member 102. Thus, the overstress post 114 and the overstress contact plate 116 do not move toward the overstress contact pin 118 and the overstress contact plate 116 does not contact the overstress contact pin 118. In the deactivated configuration 310, there can be any suitable angle between the first body member 102 and the second body member 104.

FIG. 3B shows an example of the activated configuration 320 of the seat actuator 100. In the activated configuration 320, an activation input is provided to the shape memory alloy wire 124. For example, the processor(s) 142 provides an activation signal to the switch(es) 144, and the switch(es) 144 enables a supply of electrical energy to the power pin 148. As a result, electrical energy is supplied to the shape memory alloy wire 124. As such, the shape memory alloy wire 124 can be heated and can shrink, causing the second body member 104 to pivot relative to the first body member 102. Thus, the angle between the first body member 102 and the second body member 104 can decrease. The overstress post 114 and the overstress contact plate 116 may try to move toward the overstress contact pin 118 due to the shrinking shape memory alloy wire 124. However, such movement can be prevented or resisted by the spring 140.

As the overstress post 114 moves, it can exert a force on the spring. If the force of the shape memory alloy wire 124 acting upon the overstress post 114 is less than the bias of the spring 140, the spring 140 will prevent the movement of the overstress contact plate 116 toward the overstress contact pin 118. If the force of the shape memory alloy wire 124 acting upon the overstress post 114 is greater than the bias of the spring 140, the overstress contact plate 116 can move toward and come into contact with the overstress contact pin 118. The bias of the spring 140 can correspond to a threshold stress level of the shape memory alloy wire 124.

The overstress contact pin 118 can have a first electrical state. For example, the first electrical state of the overstress contact pin 118 can be a neutral electrical state or zero electrical charge. In another example, the first electrical state of the overstress contact pin 118 can be a positive electrical state, or positive electrical charge. When the overstress contact plate 116 contacts the overstress contact pin 118, there can be a change in the electrical state of the overstress contact pin 118. For example, electrical energy from the overstress contact plate 116 can be transferred from the overstress contact plate 116 to the overstress contact pin 118. In another example, electrical energy from the overstress contact pin 118 can be transferred from the overstress contact pin 118 to the overstress contact plate 116. Further, the contact between the overstress contact plate 116 and the overstress contact pin 118 can complete a circuit.

After contact is made between the overstress contact pin 118 and the overstress contact plate 116, the overstress contact pin 118 can have a second electrical state that is different from the first electrical state. This change in electrical state of the overstress contact pin 118 can be detected by the processor(s) 142. For instance, the change in electrical state can be communicated via the trace to the signal pin 150 of the connector(s) 146. The signal pin 150 can communicate the change in electrical state of the overstress contact pin 118 to the processor(s) 142.

When the processor(s) 142 detects the change in electrical state of the overstress contact pin 118, the processor(s) 142 can provide a deactivation signal to the switch(es) 144. When the switch(es) 144 receives the deactivation signal, the switch(es) 144 can disable the supply of electrical energy to the power pin 148. As such, the shape memory alloy wire 124 can begin to cool and the seat actuator 100 can begin to return to a deactivated configuration 310. Thus, the seat actuator 100 can move from the activated configuration 320 toward the deactivated configuration 310, and the overstress post 114 and the overstress contact plate 116 can move away from the overstress contact pin 118. When the overstress contact plate 116 no longer contacts the overstress contact pin 118, the processor(s) 142 can send an activation signal to the switch(es) 144. The switch(es) 144 can enable the supply of electrical energy to the power pin 148. As such, the shape memory alloy wire 124 can heat and shrink. Thus, the seat actuator 100 can move from the deactivated configuration 310 to the activated configuration 320.

The structures and processes of the seat actuators 100, 200 as described in the examples above can be implemented in one or more vehicle seats. More particularly, structures and processes of one or more seat actuators 100, 200, as described above, can be implemented in one or more bolsters of the vehicle seat(s) in order to selectively morph the bolster(s), as described below. The arrangements described herein can also be used in other locations in a vehicle in which shape memory alloy based actuators are used.

Figure 4:
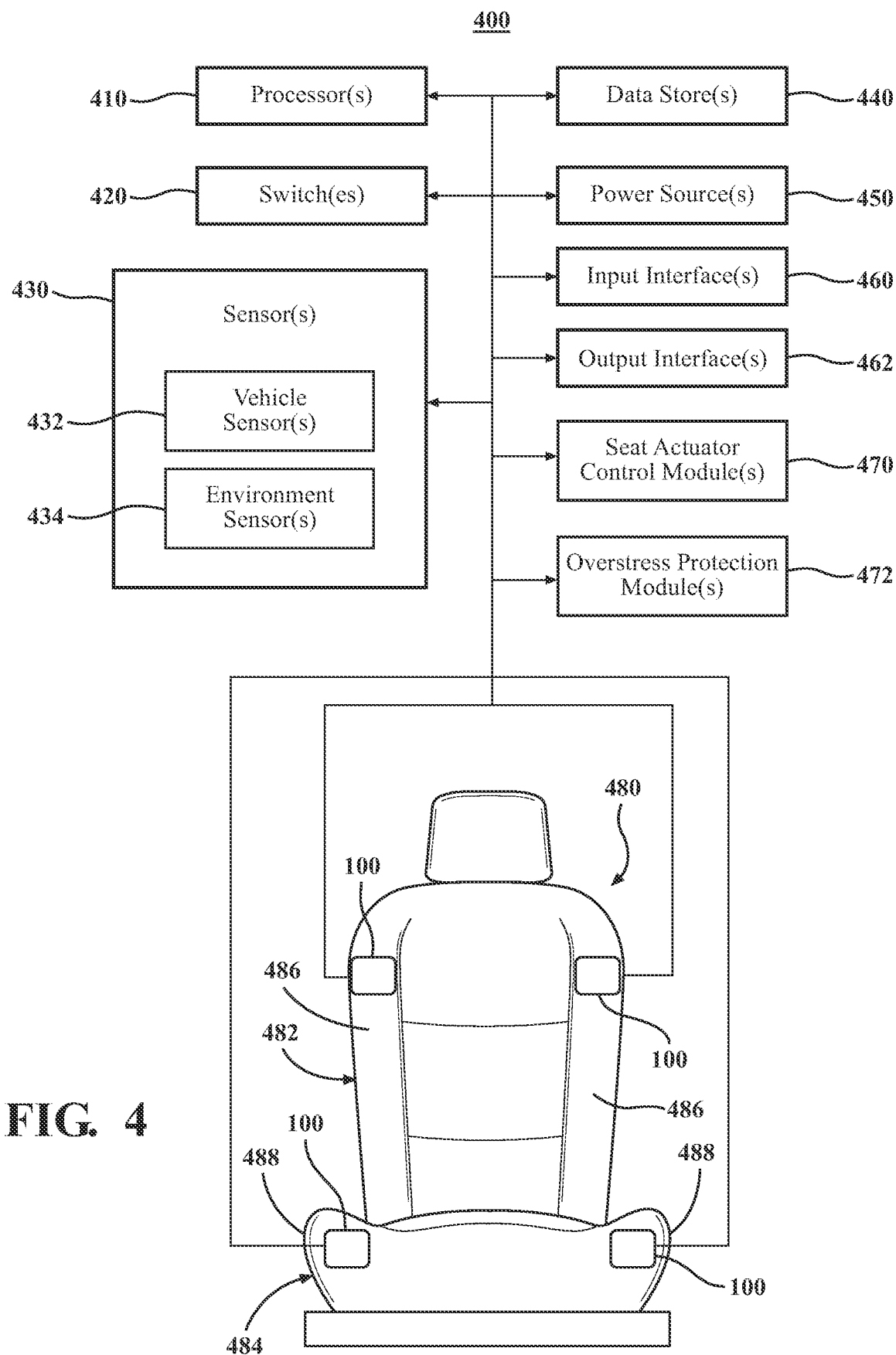
FIG. 4 is an example of a seat actuator system for a vehicle seat.

As shown in FIG. 4, an example of an overstress protection system 400 for one or more seat actuators 100, 200 is shown. The overstress protection system 400 can include one or more seat actuators 100, 200, one or more processors 410, one or more switches 420, one or more sensors 430, including one or more vehicle sensors 432 and one or more environment sensors 434, one or more data stores 440, one or more power sources 450, one or more input interfaces 460, one or more output interfaces 462, one or more seat actuator control modules 470, and one or more overstress protection modules 472.

It will be understood that it is not necessary for the overstress protection system 400 to have all of the elements shown in FIG. 4 or described herein. The overstress protection system 400 can have any combination of the various elements shown in FIG. 4. Further, the overstress protection system 400 can have additional elements to those shown in FIG. 4. In some arrangements, the overstress protection system 400 may not include one or more of the elements shown in FIG. 4. Further, the elements shown may be physically separated by large distances. Some of the possible elements of the overstress protection system 400 are shown in FIG. 4 and will now be described.

The various elements of the overstress protection system 400 as described above, for example, the processor(s) 410, the switch(es) 420, the sensor(s) 430, the data store(s) 440, the power source(s) 450, the input interface(s) 460, the output interface(s) 462, the seat actuator control module(s) 470, and the overstress protection module(s) 472 can be communicatively linked to one another or one or more other element(s) through one or more communication networks. The term "communicatively linked," as used herein, can include direct or indirect connections through a communication channel, bus, pathway, or another component or system. The term "communication network," as used herein, means one or more components designed to transmit and/or receive information from one source to another. The elements of the vehicle can include and/or execute suitable communication software, which enables the various elements to communicate with each other through the communication network and perform the functions disclosed herein.

The communication network(s) can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network(s) can be implemented as or include one or more wireless networks, whether short range (e.g., a local wireless network built using a Bluetooth or one of the IEEE 802 wireless communication protocols, e.g., 802.11 a/b/g/I, 802.15, 802.16, 802.20, Wi-Fi Protected Access (WPA or WPA2) or long range (e.g., a mobile, cellular, and/or satellite-based wireless network; GSM, TDMA, CDMA, WCDMA networks, or the like). The communication network(s) can include wired communication links and/or wireless communication links. The communication network(s) can include any combination of the above networks and/or other types of networks.

As noted above, the overstress protection system 400 can include one or more processors 410. As used herein, the term "processor" can mean any component or group of components that are configured to execute any of the processes described herein or any form of instructions to carry out such processes or cause such processes to be performed. The processor(s) 410 can be implemented with one or more general-purpose processor(s) and/or one or more special-purpose processor(s). Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) can include at least one hardware circuit (e.g., an integrated circuit) configured to carry out instructions contained in program code. In arrangements in which there is a plurality of processors, such processors can work independently from each other or one or more processors can work in combination with each other. In one or more arrangements, the processor(s) 410 can be the processor(s) 142, 242 described in connection with FIGS. 1A and 1B and 2A-2B.

The overstress protection system 400 can include one or more switches 420. As used herein, the term "switch" can mean an electrical component or device that can switch an electrical circuit, interrupting the current or diverting it from one conductor to another. As previously described, the switch(es) 420 can be a metal-oxide-semiconductor field-effect transistor (MOSFET) switch. In other examples, the switch(es) 420 can be any suitable solid state switch, including any suitable transistor, silicon controlled rectifier (SCR), DIode AC (DIAC), TRIode AC (TRIAC), insulated gate bipolar transistor (IGBT), and/or a gate turn-off thyristor (GTO). In one or more arrangements, the switch(es) 420 can be the switch(es) 144, 244 described in connection with FIGS. 1A and 1B and 2A-2B.

The overstress protection system 400 can include one or more sensors 430. The term "sensor," as used herein, can include any device, component, and/or system that can detect, determine, assess, monitor, measure, quantify, acquire, and/or sense something. The sensor(s) 430 can detect, determine, assess, monitor, measure, quantify, acquire, and/or sense in real-time. The term "real-time," as used herein, can mean a level of processing responsiveness that a user or system senses as sufficiently immediate for a particular process or determination to be made, or that enables the processor to keep up with some external process. The sensor(s) 430 can be operatively connected to the processor(s) 410, the data store(s) 440, and/or other elements of the vehicle (including any of the elements shown in FIG. 4). In arrangements in which the vehicle includes a plurality of sensors 430, the sensors 430 can work independently from each other. Alternatively, two or more of the sensors 430 can work in combination with each other. In this example, the two or more sensors 430 can form a sensor network.

The sensor(s) 430 can include any suitable type of sensor. The sensor(s) 430 can include one or more vehicle sensors 432. The vehicle sensor(s) 432 can detect, determine, assess, monitor, measure, quantify, and/or sense information about the vehicle itself (e.g., position, orientation, speed, etc.). The sensor(s) 430 can also include one or more environment sensors 434. The environment sensor(s) 434 can be configured to detect, determine, assess, monitor, measure, quantify, acquire, and/or sense driving environment data. The term "driving environment data," as used herein, includes any data or information about the external environment in which a vehicle is located or one or more portions thereof.

The overstress protection system 400 can include one or more data stores 440 for storing one or more types of data. The data stores(s) 440 can include volatile and/or non-volatile memory. Examples of suitable data stores include RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 440 can be a component of the processor(s) 410, or the data store(s) 440 can be operatively connected to the processor(s) 410 for use thereby.

The overstress protection system 400 can include one or more power sources 450. The power source(s) 450 can be any power source capable of and/or configured to energize the seat actuator(s) 100. For example, the power source(s) 450 can include one or more batteries, one or more fuel cells, one or more generators, one or more alternators, one or more solar cells, and combinations thereof.

The overstress protection system 400 can include one or more input interfaces 460. The term "input interface," as used herein, includes any device, component, system, element, or arrangement or groups thereof that enable information and/or data to be entered into a machine. The input interface(s) 460 can receive an input from a vehicle occupant (e.g., a driver or a passenger). Any suitable input interface can be used, including a keypad, display, touch screen, multi-touch screen, button, joystick, mouse, trackball, microphone, and/or any combination thereof.

The overstress protection system 400 can include one or more output interfaces 462. The term "output interface," as used herein, includes any device, component, system, element, or arrangement or groups thereof that enable information and/or data to be presented to a vehicle occupant (e.g., a person, a vehicle occupant, etc.). The output interface(s) 462 can present information and/or data to a vehicle occupant. The output interface(s) 462 can include a display. Alternatively or additionally, the output interface(s) 462 can include an earphone and/or speaker. Some components of the vehicle may serve as both a component of the input interface(s) 460 and a component of the output interface(s) 462.

The overstress protection system 400 can include one or more modules, at least some of which will be described in greater detail below. The module(s) can be implemented as computer readable program code that, when executed by the processor(s) 410, implement one or more of the various processes described herein. The module(s) can be a component of the processor(s) 410, or the module(s) can be executed on and/or distributed among other processing systems to which the processor(s) is operatively connected. The module(s) can include instructions (e.g., program logic) executable by the processor(s) 410. Alternatively or additionally, the data store(s) 440 may contain such instructions. In one or more arrangements, the module(s) described herein can include artificial or computational intelligence elements, e.g., neural network, fuzzy logic, or other machine learning algorithms. Further, in one or more arrangements, the module(s) can be distributed among a plurality of modules. In one or more arrangements, two or more of the modules described herein can be combined into a single module.

The overstress protection system 400 can include one or more seat actuator control modules 470. The seat actuator control module(s) 470 can include profiles and logic for actively controlling the seat actuator(s) 100 according to arrangements herein. The seat actuator control module(s) 470 can be configured to determine when the seat actuator(s) 100 should be activated or deactivated. The seat actuator control module(s) 470 can be configured to do so in any suitable manner. For example, the seat actuator control module(s) 470 can be configured to analyze data or information acquired by the sensor(s) 430. Alternatively or additionally, the seat actuator control module(s) 470 can be configured to detect user inputs (e.g., commands) provided on the input interface(s) 460.

The seat actuator control module(s) 470 can be configured to cause the seat actuator(s) 100, 200 to be activated or deactivated. The term "cause" or "causing," as used herein, means to make, force, compel, direct, command, instruct, and/or enable an event or action to occur or at least be in a state where such event or action may occur, either in a direct or indirect manner. For example the seat actuator control module(s) 470 can selectively enable or disable a supply of electrical energy from the power source(s) 450 to the seat actuator(s) 100, 200. The seat actuator control module(s) 470 can be configured to send control signals or commands over a communication network to the seat actuator(s) 100, 200 and/or other elements of the overstress protection system 400.

The overstress protection system 400 can include one or more overstress protection modules 472. The overstress protection module(s) 472 can include profiles and logic for actively controlling the seat actuator(s) 100, 200 according to arrangements herein. The overstress protection module(s) 472 can be configured to determine when the seat actuator(s) 100, 200 should be deactivated to protect the shape memory alloy wire 124, 224 from becoming overstressed. The overstress protection module(s) 472 can be configured to do so in any suitable manner. For example, the overstress protection module(s) 472 can detect an overstress condition. The overstress condition can be detected in any suitable manner. For example, as described above, the processor(s) 410 and/or the overstress protection module(s) 472 can receive a signal from the seat actuator(s) 100, 200 that the overstress contact plate 116, 216 is in contact with the overstress contact pin 118, 218. In this example, an overstress condition can be detected. In response, the overstress protection module(s) 472 can cause the seat actuator(s) 100, 200 to be deactivated. For example, the overstress protection module(s) 472 can send a deactivation signal to the seat actuator(s) 100, 200.

The seat actuator control module(s) 470 and the overstress protection module(s) 472 can be configured to operate simultaneously to activate and deactivate the seat actuator(s) 100, 200. For example, if the seat actuator control module(s) 470 determines that the seat actuator(s) 100, 200 should be activated, the seat actuator control module(s) 470 can activate the seat actuator(s) 100, 200. While the seat actuator(s) 100, 200 is/are activated, the overstress protection module(s) 472 can determine whether the seat actuator(s) 100, 200 should be deactivated. If the overstress protection module(s) 472 determines that the seat actuator(s) 100, 200 should be deactivated, such as by detecting an overstress condition in the seat actuator(s) 100, 200, the overstress protection module(s) 472 can deactivate the seat actuator(s) 100, 200. When there is no longer an overstress condition in the seat actuator(s) 100, 200, the seat actuator(s) 100, 200 can be re-activated by the seat actuator control module(s) 470 and/or the overstress protection module(s) 472. This cycle can repeat.

The various elements of the overstress protection system 400 as described above can be operatively connected to one or more portions of a vehicle. The vehicle can include one or more vehicle seats 480. The vehicle seat(s) 480 can be for any vehicle occupant(s), such as for a driver and/or for a passenger. The vehicle seat(s) 480 can be any type of vehicle seat, now known or later developed. The vehicle seat(s) 480 can have any suitable configuration. For example, the vehicle seat 480 can include a back portion 482 and a cushion portion 484. The vehicle seat 480 can include bolsters 486 of the back portion 482. The vehicle seat 480 can include bolsters 488 of the cushion portion 484. The seat actuator(s) 100, 200 can be located within the back portion 482 and/or within the cushion portion 484 of the vehicle seat(s) 480. More particularly, the seat actuator(s) 100, 200 can be located within the bolster(s) 486, 488.

Figure 5A:
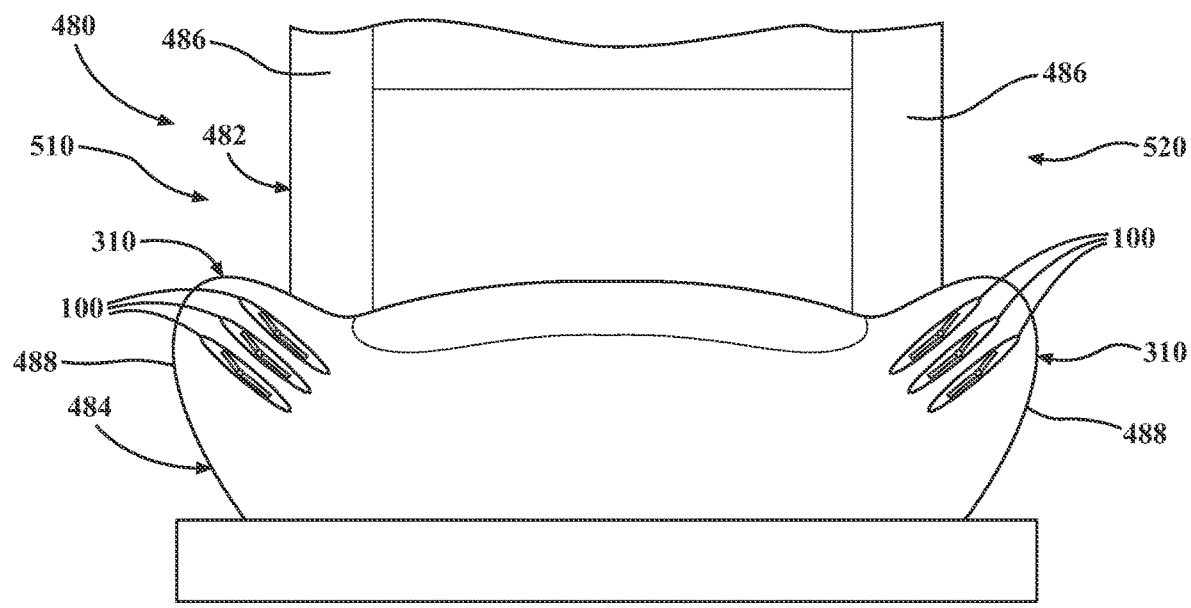
FIG. 5A is an example of a portion of the vehicle seat, showing a bolster in a deactivated configuration.
Figure 5B:
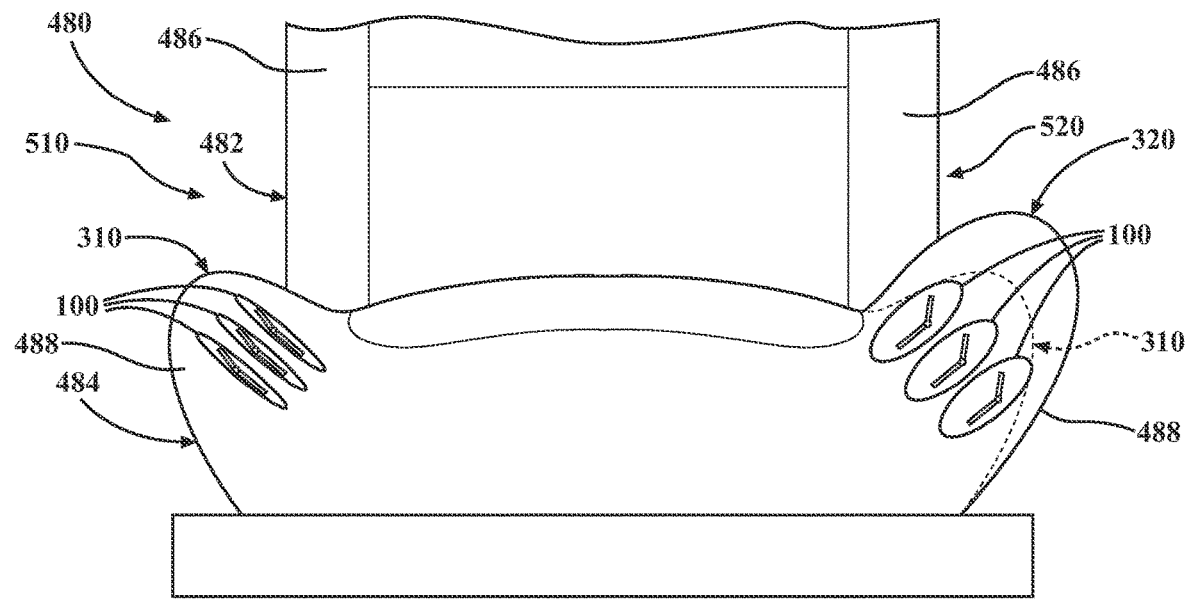
FIG. 5B is an example of the portion of the vehicle seat, showing the bolster in an activated configuration.

As shown in FIGS. 5A and 5B, an example of a portion of a vehicle seat 480 having seat actuator(s) 100, 200 is shown. For purposes of this example, the seat actuator(s) 100, 200 will be described in connection with the cushion portion 484 of the vehicle seat 480, but it will be understood that this description applies equally to the seat actuator(s) 100, 200 in connection with the back portion 482 of the vehicle seat 480.

The seat actuator(s) 100, 200 can be operatively positioned within the vehicle seat 480 relative to one or more surfaces or portions of the vehicle seat 480. The surfaces can be a surface of the back portion 482, the cushion portion 484, the bolster 486 of the back portion 482, and/or the bolster 488 of the cushion portion 484. When actuated, the seat actuator(s) 100, 200 can cause the surfaces or portions of the vehicle seats 480 to morph into a different configuration. The seat actuator(s) 100, 200 can be operatively positioned such that portions of the vehicle seats 480 can be morphed in one or more directions. In the arrangements shown in FIGS. 5A and 5B, it should be noted that the seat actuator 100, 200 can be a single seat actuator 100, 200, a single stack of a plurality of seat actuators 100, 200, a plurality of seat actuators 100, 200, a plurality of stacks of seat actuators 100, 200, and/or combinations thereof.

FIG. 5A shows an example of the seat actuator(s) 100, 200 in a deactivated configuration, such as is shown in FIG. 3A. General representations of the seat actuator(s) 100, 200 are shown in FIGS. 5A and 5B for purposes of clarity. In this example, the vehicle seat 480 can include a plurality of seat actuators 100 in the bolsters 486,488 on both a first side 510 and a second side 520 of the vehicle seat. The seat actuator(s) 100, 200 on the first side 510 can have a deactivated configuration, such as is shown in FIG. 3A. As a result, the bolster 486 on the first side 510 can have a deactivated configuration, and the bolster 488 on the second side 520 can have a deactivated configuration. The deactivated configurations can be substantially mirror images of each other.

FIG. 5B shows an example of the seat actuator(s) 100, 200 on the first side 510 in the deactivated configuration, such as is shown in FIG. 3A, and the seat actuator(s) 100, 200 on the second side 520 in the activated configuration, such as is shown in FIG. 3B. As a result, the bolster 486 on the first side 510 can have a deactivated configuration and the bolster 488 on the second side 520 can have an activated configuration. As shown in FIG. 5B, the overall size of the bolster 488 on the second side 520 has become enlarged. It will be appreciated that the bolster 488 in the activated configuration can provide additional resistance to lateral acceleration of a vehicle occupant in that direction, such as when a vehicle is turning.

The seat actuator(s) 100, 200 can be any element or combination of elements, such as those described above, that is or are operable to modify, adjust, and/or alter one or more surfaces or portions of the vehicle seats(s) 480. The seat actuator(s) 100, 200 may activate responsive to receiving signals or other inputs from the processor(s) 410 and/or the seat actuator control module(s) 470. The processor(s) 410 and/or the seat actuator control module(s) 470 can be operatively connected to the seat actuator(s) 100, 200.

Now that the various potential systems, devices, elements, and/or components of the vehicle have been described, various methods, including various possible steps of such methods, will now be described. The methods described may be applicable to the arrangements described above, but it is to be understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 6:
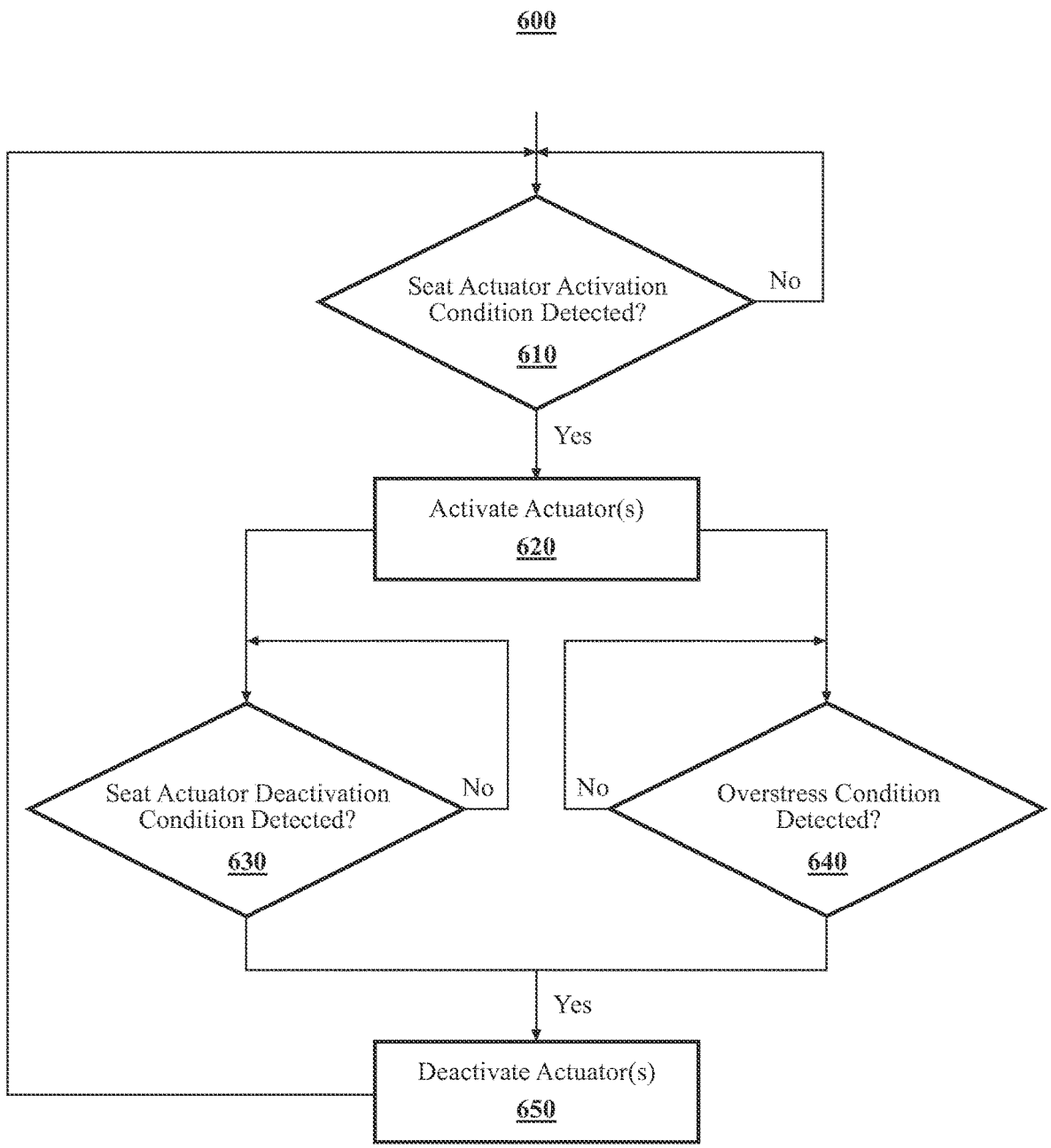
FIG. 6 is an example of a method of selectively morphing a portion of a vehicle seat with overstress protection.

Referring to FIG. 6, an example of a method 600 is shown. For the sake of discussion, the method 600 can begin with the seat actuator(s) 100, 200 in the deactivated configuration, such as is shown in FIG. 5A. At block 610, the overstress protection system 400 can determine whether a seat activation condition has been detected. The seat activation condition can be detected by, for example, the seat actuator control module(s) 470, the processor(s) 410, and/or the sensor(s) 430. For example, the seat actuator control module(s) 470, the processor(s) 410, and one/or more sensor(s) 430 can determine that data acquired by the vehicle sensor(s) 432 meets a seat activation condition.

If a seat activation condition is not detected, the method can end, return to block 610, or proceed to some other block. However, if a seat activation condition is detected, then the method can proceed to block 620. At block 620, the seat actuator(s) 100, 200 can be activated. Of course, the seat actuator control module(s) 470 and/or the processor(s) 410 may only actuate certain individual seat actuator(s) 100, 200 while leaving others deactivated.

When activated, the seat actuator(s) 100, 200 can morph to the activated configuration, such as is shown in FIG. 5B. The seat actuator(s) 100, 200 can interact with portions of the vehicle seat(s) 480 to cause a portion of the vehicle seat(s) 480 to morph into the activated configuration, such as is shown in FIG. 5B. The method can continue to blocks 630 and 640.

At block 630, the overstress protection system 400 can determine whether a seat deactivation condition has been detected. The seat deactivation condition can be detected by the processor(s) 410 and/or the seat actuator control module(s) 470, such as based on data acquired by the sensor(s) 430 and/or by detecting a user input or the cessation of a user input to the input interface(s) 460. If a seat deactivation condition is not detected, the method 600 can return to block 630, or proceed to some other block. However, if a deactivation condition is detected, then the method can proceed to block 650.

At block 640, the overstress protection system 400 can determine whether an overstress condition has been detected. The overstress condition can be detected by the processor(s) 410 and/or the overstress protection module(s) 472. For example, the processor(s) 410 and/or the overstress protection module(s) 472 can detect whether the overstress contact plate 116, 216 is in contact with the overstress contact pin 118, 218. If an overstress condition is not detected, the method 600 can return to block 640, or proceed to some other block. However, if an overstress condition is detected, then the method can proceed to block 650.

At block 650, the seat actuator(s) 100, 200 can be deactivated. After deactivation of the seat actuator(s) 100, 200, the method 600 can end. Alternatively, the method 600 can return to block 610 or some other block.

It should be noted that, in some arrangements, blocks 630 and 640 can be performed simultaneously. In other arrangements, blocks 630 and 640 can be performed sequentially in any suitable manner.

The arrangements described herein can provide the benefit of reducing and/or preventing the occurrence of overstress within the shape memory alloy wires in the seat actuators. As a result, the life of the shape memory alloy wires and thus, the seat actuators, can be extended. Thus, the seat actuators can have improved quality and duration of operability.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the function(s) noted in the block diagrams may occur out of the order noted in the figures. For example, two blocks shown in succession may, in fact, be executed substantially concurrently, or the blocks may sometimes be executed in the reverse order, depending on the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suitable. A typical combination of hardware and software can be a processing system with computer-useable program code that, when being loaded and executed, controls the processing system such that it carries out the methods described herein. The systems, components, and/or processes can also be embedded in a computer-readable storage, such as a computer program product or other data programs storage device, readable by a machine, tangibly embodying a program of instructions executable by the machine to perform methods and processes described herein. These elements can also be embedded in an application product which comprises all the features enabling the implementation of the methods described herein and which, when loaded in a processing system, is able to carry out these methods.

Furthermore, the arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The term "computer-readable storage medium," as used herein, means a non-transitory storage medium A computer-readable storage medium may be, for example, an electronic magnetic, optical, electromagnetic, infrared, or semiconductor system, apparatus, or device, any suitable combination of the foregoing, or any other suitable computer-readable storage medium. More specific examples of the computer-readable storage medium can include an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As described herein, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++, or the like, and conventional procedural programming languages, such as the "C" programming language or similar programming languages. The program code may execute entirely on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein, refers to and encompasses any and all possible combinations of one or more of the associated listed items. As an example, the phrase "at least one of A, B, and C" includes A only, B only, C only, or any combination thereof (e.g., AB, AC, BC, or ABC).

The term "substantially" and/or "about," as used herein, include exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degrees/percent/units or less. In some examples, "substantially" can include being within normal manufacturing tolerances.

The aspects herein can be embodied in other forms without departing from the spirit or essential attributes thereof. Accordingly, reference should be made to the following claims, rather than to the foregoing specification, as indicating the scope of the invention.

What is claimed is:

1. An actuator for a vehicle seat, comprising:
 a first body member;
 a second body member pivotably connected to the first body member;
 an overstress post operatively connected to the second body member, the overstress post being movable on the second body member;
 an overstress contact plate, the overstress contact plate being operatively connected to the overstress post, whereby movement of the overstress post causes movement of the overstress contact plate along the second body member;
an overstress contact pin operatively connected to the second body member; and
a shape memory alloy wire, the shape memory alloy wire having a first end portion and a second end portion, the first end portion being operatively connected to the first body member, the shape memory alloy wire being operatively connected to the overstress post; and
the shape memory alloy wire being configured such that, when activated, the shape memory alloy wire shrinks, causing one of the first body member and the second body member to pivot relative to the other one of the first body member and the second body member and causing the overstress contact plate to move toward the overstress contact pin.

2. The actuator of claim 1, wherein the first body member pivots relative to the second body member.

3. The actuator of claim 1, wherein the second body member pivots relative to the first body member.

4. The actuator of claim 1, wherein the second end portion of the shape memory alloy wire is operatively connected to one of the first body member and the second body member, and wherein the shape memory alloy wire extends from the one of the first body member and the second body member while wrapping around the overstress post, whereby the shape memory alloy wire is operatively connected to the overstress post.

5. The actuator of claim 1, further comprising:
a guidepost, wherein the shape memory alloy wire passes between the actuator and the guidepost, whereby movement of the shape memory alloy wire away from the actuator is restricted by the guidepost.

6. The actuator of claim 1, further comprising:
a spring operatively positioned to resist movement of the overstress post in a direction toward the overstress contact pin, wherein the spring has a pre-determined bias,
whereby, when a force exerted by the shape memory alloy wire on the overstress post exceeds the pre-determined bias of the spring, the overstress contact plate contacts the overstress contact pin, causing the shape memory alloy wire to become deactivated.

7. The actuator of claim 1, wherein each of the first body member and the second body member includes a first side and a second side, wherein the shape memory alloy wire is operatively connected to the overstress post on the first side, and wherein the overstress contact plate is operatively connected to the overstress post on the second side.

8. The actuator of claim 1, further comprising:
a slot in one of the first body member and the second body member, wherein the slot restricts movement of the overstress post and the overstress contact plate to substantially linear movement toward or away from the overstress contact pin.

9. An overstress protection system, comprising:
an actuator, the actuator including:
a first body member;
a second body member pivotably connected to the first body member;
an overstress post operatively connected to the second body member, the overstress post being movable on the second body member;
an overstress contact plate, the overstress contact plate being operatively connected to the overstress post, whereby movement of the overstress post causes movement of the overstress contact plate;
an overstress contact pin operatively connected to the second body member; and a shape memory alloy wire, the shape memory alloy wire having a first end portion and a second end portion, the first end portion being operatively connected to the first body member, the shape memory alloy wire being operatively connected to the overstress post, the shape memory alloy wire being configured such that, when activated, the shape memory alloy wire shrinks, causing one of the first body member and the second body member to pivot relative to the other one of the first body member and the second body member and causing the overstress contact plate to move toward the overstress contact pin; and
one or more processors, the one or more processors being configured to activate or deactivate the shape memory alloy wire.

10. The actuator of claim 9, wherein the first body member pivots relative to the second body member.

11. The actuator of claim 9, wherein the second body member pivots relative to the first body member.

12. The actuator of claim 9, wherein the second end portion of the shape memory alloy wire is operatively connected to one of the first body member and the second body member, and wherein the shape memory alloy wire extends from the one of the first body member and the second body member while wrapping around the overstress post, whereby the shape memory alloy wire is operatively connected to the overstress post.

13. The overstress protection system of claim 9, further comprising:
a spring operatively positioned to resist movement of the overstress post in a direction toward one of the first body member and the second body member, the spring having a pre-determined bias,
whereby, when a force exerted by the shape memory alloy wire on the overstress post exceeds the pre-determined bias of the spring, the overstress contact plate contacts the overstress contact pin, causing the shape memory alloy wire to become deactivated.

14. The overstress protection system of claim 9, wherein each of the first body member and the second body member includes a first side and a second side, wherein the shape memory alloy wire is operatively connected to the overstress post on the first side, and wherein the overstress contact plate is operatively connected to the overstress post on the second side.

15. The overstress protection system of claim 9, further comprising:
a slot in one of the first body member and the second body member, wherein the slot restricts movement of the overstress post and the overstress contact plate to substantially linear movement toward or away from the overstress contact pin.

16. The overstress protection system of claim 9, wherein the one or more processors are configured to activate the shape memory alloy wire in response to an activation input.

17. The overstress protection system of claim 9, wherein the one or more processors are configured to deactivate the shape memory alloy wire in response to deactivation condition, wherein the deactivation condition includes when the overstress contact plate contacts the overstress contact pin.

18. The overstress protection system of claim 9, further comprising:
a vehicle seat, wherein the actuator is operatively positioned within the vehicle seat, and wherein, when activated, the actuator is configured to deform at least a portion of the vehicle seat.

19. The overstress protection system of claim 18, wherein the vehicle seat includes a bolster, wherein the actuator is operatively positioned within the bolster, and wherein, when activated, the actuator is configured to deform at least a portion of the bolster.

20. An overstress protection system, comprising:
an actuator, the actuator including:
  a first body member;
  a second body member pivotably connected to the first body member;
  an overstress post operatively connected to the second body member, the overstress post being movable on the second body member;
  an overstress contact plate, the overstress contact plate being operatively connected to the overstress post, whereby movement of the overstress post causes movement of the overstress contact plate;
  an overstress contact pin operatively connected to the second body member; and a shape memory alloy wire, the shape memory alloy wire having a first end portion and a second end portion, the first end portion being operatively connected to the first body member, the shape memory alloy wire being operatively connected to the overstress post, the shape memory alloy wire being configured such that, when activated, the shape memory alloy wire shrinks, causing one of the first body member and the second body member to pivot relative to the other one of the first body member and the second body member and causing the overstress contact plate to move toward the overstress contact pin;
  a spring operatively positioned to resist movement of the overstress post in a direction toward one of the first body member and the second body member, the spring having a pre-determined bias, whereby, when a force exerted by the shape memory alloy wire on the overstress post exceeds the pre-determined bias of the spring, the overstress contact plate contacts the overstress contact pin; and
one or more processors, the one or more processors being configured to activate the shape memory alloy wire in response to an activation input, and the one or more processors being configured to deactivate the shape memory alloy wire in response to deactivation condition, the deactivation condition including when the overstress contact plate contacts the overstress contact pin.

* * * * *